US010585177B2

(12) United States Patent
Ding et al.

(10) Patent No.: US 10,585,177 B2
(45) Date of Patent: Mar. 10, 2020

(54) TUNING FOR ULTRASONIC TRANSDUCER

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 217 days.

(21) Appl. No.: 15/626,964

(22) Filed: Jun. 19, 2017

(65) Prior Publication Data

US 2018/0364341 A1    Dec. 20, 2018

(51) Int. Cl.
*G01S 7/52*     (2006.01)
*G01S 7/524*    (2006.01)

(52) U.S. Cl.
CPC .......... *G01S 7/52004* (2013.01); *G01S 7/524* (2013.01)

(58) Field of Classification Search
CPC .............................. G01S 7/52004; G01S 7/524
See application file for complete search history.

(56) References Cited

U.S. PATENT DOCUMENTS

| | | | | |
|---|---|---|---|---|
| 3,387,257 A * | 6/1968 | Brech | ................... | B06B 1/0215 327/100 |
| 3,409,787 A * | 11/1968 | Eugene | ................... | B06B 1/023 310/316.01 |
| 5,087,850 A * | 2/1992 | Suzuta | ................... | B06B 1/0207 310/316.01 |
| 5,198,713 A * | 3/1993 | Suzuta | ................... | B06B 1/0207 310/316.01 |
| 5,460,595 A | 10/1995 | Hall et al. | | |
| 6,731,569 B2 * | 5/2004 | Yurchenko | ............ | B06B 1/0215 367/138 |
| 2015/0331100 A1 * | 11/2015 | Hsu | ..................... | G01S 7/52004 73/598 |
| 2018/0364341 A1 * | 12/2018 | Ding | ....................... | G01S 7/524 |
| 2019/0033434 A1 * | 1/2019 | Ding | .................. | G01S 7/52036 |
| 2019/0047019 A1 * | 2/2019 | Ding | ..................... | B06B 1/0223 |

* cited by examiner

*Primary Examiner* — Daniel Pihulic

(74) *Attorney, Agent, or Firm* — Michael A. Davis, Jr.; Charles A. Brill; Frank D. Cimino

(57) ABSTRACT

A circuit includes an ultrasonic transducer having a first terminal and a second terminal. The first terminal receives an electrical drive signal and excites the ultrasonic transducer during an excitation interval to provide an ultrasound signal. The first terminal also provides an electrical receive signal in response to the ultrasonic transducer receiving a reflected ultrasound signal. The circuit includes a capacitor having one terminal connected to the first terminal of the ultrasonic transducer. A resistor is connected to another terminal of the capacitor to form a resistor-capacitor (RC) network. At least one of resistor and the capacitor have a variable resistance or capacitance value that is set to tune the RC network to mitigate ringing of the ultrasonic transducer following the excitation interval.

20 Claims, 8 Drawing Sheets

TUNING FOR ULTRASONIC TRANSDUCER

TECHNICAL FIELD

This disclosure relates to electrical circuits, and more particularly to tuning for an ultrasonic transducer.

BACKGROUND

Ultrasonic transducers convert electrical alternating current (AC) signals into ultrasound, as well as converting ultrasound signals into AC signals. Ultrasonic transducers typically are piezoelectric transducers where piezoelectric crystals change size and shape when a voltage is applied. An applied AC voltage causes them to oscillate at the same frequency and produce ultrasonic sound. The beam pattern of the transducer can be determined by the active transducer area and shape, the ultrasound wavelength, and the sound velocity of the propagation medium such as air. Since piezoelectric materials generate a voltage when force is applied to them, they can also work as ultrasonic detectors. Some systems use separate transmitters to excite the transducer and receivers to receive reflected ultrasound energy where each transmitter and receiver has a separate transducer. Other systems combine both transmitter and receiver functions using a single transducer as a transceiver, where the transducer is excited for a period by the transmitter and then utilized to detect reflected energy from a target after excitation. In combined systems, there is a time period after excitation that cannot be used to receive reflected energy since this period is still being influenced by the transducer excitation which dampens over time.

SUMMARY

This disclosure relates to tuning for an ultrasonic transducer.

In one example, a circuit includes an ultrasonic transducer having a first terminal and a second terminal. The first terminal receives an electrical drive signal and excites the ultrasonic transducer during an excitation interval to provide an ultrasound signal. The first terminal also provides an electrical receive signal in response to the ultrasonic transducer receiving a reflected ultrasound signal. The circuit includes a capacitor having one terminal connected to the first terminal of the ultrasonic transducer. A resistor is connected to another terminal of the capacitor to form a resistor-capacitor (RC) network. At least one of resistor and the capacitor have a variable resistance or capacitance value that is set to tune the RC network to mitigate ringing of the ultrasonic transducer following the excitation interval.

In another example, a circuit includes a transmitter circuit having an output to provide an electrical drive signal to drive a terminal of an ultrasonic transducer during an excitation interval. A receiver circuit having an input connected to the terminal of the ultrasonic transducer receives an electrical receive signal from the ultrasonic transducer. The circuit includes a capacitor having one terminal connected to the terminal of the ultrasonic transducer. A resistor is connected to another terminal of the capacitor to form a resistor-capacitor (RC) network. At least one of resistor and the capacitor have a variable resistance or capacitance value that is set to tune the RC network to mitigate ringing of the at the terminal of the ultrasonic transducer following the excitation interval.

In yet another example, a method includes exciting an ultrasonic transducer having a first terminal and a second terminal. The first terminal is connected to a capacitor to receive an electrical drive signal to excite the ultrasonic transducer. The method includes monitoring a signal at the first terminal of the ultrasonic transducer with respect to a predetermined threshold after disabling the electrical drive signal from exciting the ultrasonic transducer. The method includes adjusting a variable resistor connected to another terminal of the capacitor if the signal at the first terminal of the ultrasonic transducer is above the predetermined threshold. The variable resistor and the capacitor form a resistor-capacitor (RC) network that is adjusted to mitigate ringing at the first terminal of the ultrasonic transducer in response to the disabling of the electrical drive signal.

DETAILED DESCRIPTION

This disclosure relates to adjustable tuning applied to mitigate ringing in response to an excitation signal applied to an ultrasonic transducer. The adjustable tuning circuit described herein enables the short distance performance of an ultrasonic ranging circuit to be improved by mitigating ringing of the ultrasonic transducer after excitation from an electrical drive signal. A capacitor (e.g., fixed or variable) coupled to one terminal of the ultrasonic transducer is coupled to a variable resistor to form a resistor/capacitor (RC) network which has the effect of reducing the amount of time it takes for the transducer to dampen after excitation. By reducing the dampening time of the ultrasonic transducer, ranging of the transducer can be enhanced because objects can be detected closer to the transducer. The short range sensing is augmented because received echo signals from the objects at closer distances (e.g., less time until echo received) can be processed by a receiver without being affected by ringing of the previous excitation applied to the transducer.

As a further example, a control circuit can be provided that executes a calibration procedure when no objects are in sensing range of the transducer. During calibration, excitation can be provided to the transducer where a receiver monitors a signal (e.g., the damped signal provided by the transducer in response to excitation) with respect to a threshold. The variable resistor can tune the RC network formed with the capacitor in response to a control command from the control circuit. By automatically tuning the RC network in this manner, ringing at the terminal of the ultrasonic transducer in response to excitation can be reduced, which enables received echo signals to be detected at closer ranges to the transducer.

Figure 1:
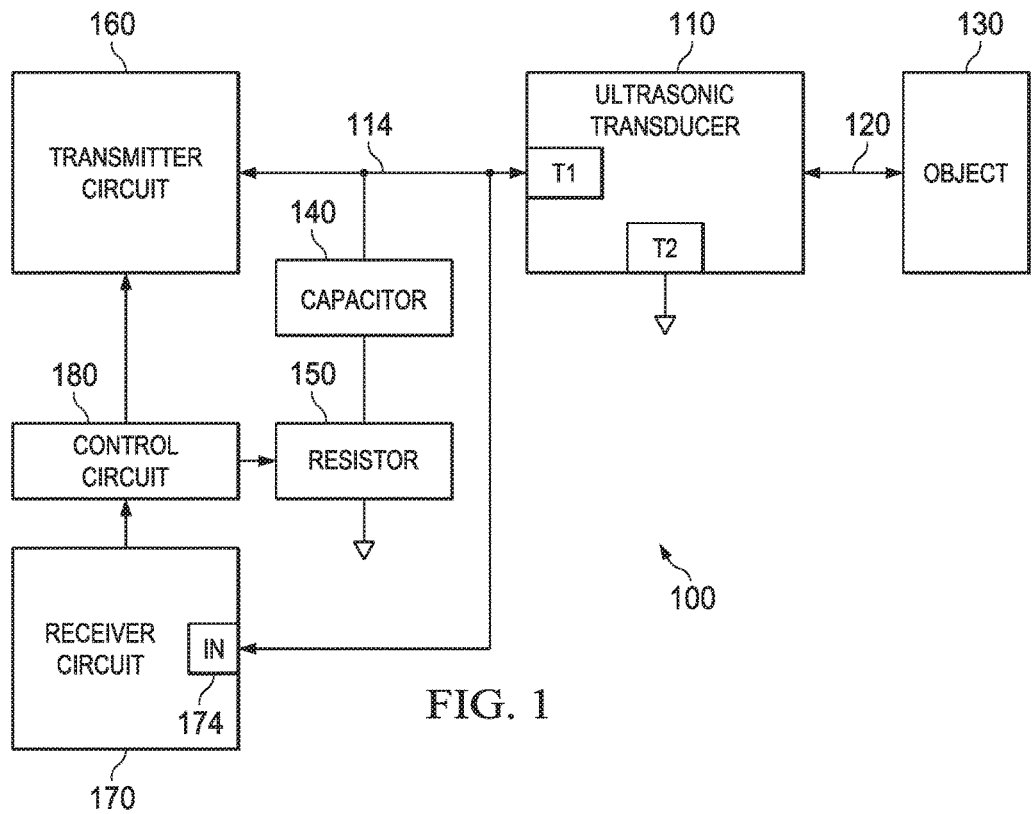
FIG. 1 illustrates an example block diagram of a circuit that utilizes an adjustable resistor/capacitor network to mitigate ringing of an ultrasonic transducer.

FIG. 1 illustrates an example circuit 100 that utilizes an adjustable resistor/capacitor network to mitigate ringing of an ultrasonic transducer 110. As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip).

The circuit 100 includes the ultrasonic transducer 110 having a first terminal T1 and a second terminal T2. The first terminal T1 receives an electrical drive signal at 114 and transmits an ultrasound signal 120 in response to the electrical drive signal. The ultrasound signal 120 is transmitted and after a period of time (e.g., time it takes for signal to propagate in air) touches an object 130 which reflects an echo signal that is returned and received back at the ultrasonic transducer 110. The first terminal T1 also provides an electrical receive signal in response to the ultrasonic transducer receiving the reflected ultrasound signal from the object 130. A capacitor 140 (e.g., fixed or variable capacitor) includes one terminal connected to the first terminal T1 of the ultrasonic transducer 110. A resistor 150 (e.g., fixed or variable) is connected to another terminal of the capacitor 140 to form a resistor-capacitor (RC) network. The resistor 150 and the capacitor 140 form a resistor-capacitor (RC) network. At least one of resistor 150 and the capacitor 140 have a variable resistance or capacitance value that is set to tune the RC network to mitigate ringing of the electrical drive signal 114. For example, controllable switches may be employed to select more or less resistance and/or capacitance that form the RC network described herein.

The resistor 150 has a resistance value that is set to tune the RC network to mitigate ringing after disabling of the electrical drive signal at T1. In another example, the capacitor value of the capacitor 140 is adjusted to mitigate ringing of the drive signal at T1. As used herein, the term ringing refers to the amount of time it takes for the signal amplitude of the transducer at T1 to drop below a threshold after being excited by the electrical drive signal at 114. The ringing that occurs in response to excitation causes noise that can adversely affect short range sensing. Thus, the transducer 110 cannot suitably receive echo signals from the object 130 until the ringing in response to excitation has dampened (e.g., dampened below the threshold).

As an example, a transmitter circuit 160 generates the electrical drive signal at 114 to the first terminal T1 of the ultrasonic transducer 110. The transmitter circuit 160 drives the electrical drive signal 114 during an excitation interval which is defined as the time the transmitter circuit actively drives the transducer via the signal 114. Following the excitation interval, the RC network formed by the capacitor 140 and resistor 150 mitigate ringing of the transducer 110 (e.g., cause the terminal T1 of the transducer to dampen quicker following the excitation interval). The transmitter circuit 160 includes a push pull amplifier (see e.g., FIG. 2) that generates the electrical drive signal at 114 that is provided as an excitation signal to the first terminal T1 of the ultrasonic transducer 110. The push pull amplifier can be coupled to an inductor that provides the electrical drive signal to the first terminal T1 of the ultrasonic transducer 110.

A receiver circuit 170 receives the electrical receive signal from T1 at an input 174 in response to receiving the reflected ultrasound signal from the object 130. Also, the receiver 170 can monitor T1 of the ultrasonic transducer 110 at input 174 during a calibration procedure. The monitoring occurs after excitation via the signal 114 that is provided by the transmitter 160 has been disabled and the object 130 is outside a given range to provide an echo signal (e.g., object no closer than a predetermined distance to the transducer). The receiver circuit 170 can include a series resistance (see e.g., FIG. 2) coupled to the first terminal T1 of the ultrasonic transducer 110 to receive the electrical receive signal. In some examples, the voltages generated by the transmitter 160 and transducer 110 can be quite high (e.g., greater than 100 volts). Thus, the receiver circuit 170 can also include a clamp circuit to limit the voltage of the electrical receive signal at the receiver from the ultrasonic transducer. Another clamp circuit (see e.g., FIG. 3) can be provided to limit the voltage of the electrical receive signal that is applied to the variable resistor 150.

A control circuit 180 can be provided to adjust the capacitor 140 and/or resistor 150 based on comparing a signal from T1 at the receiver circuit input 174, which is in response to disabling the electrical drive signal at 114 (e.g., after excitation is applied and during dampening period of transducer yet before echo signal has been received), to a predetermined threshold voltage. The signal at T1 after excitation is disabled is thus correlated to the time it takes for the transducer 110 to dampen after the electrical drive signal has been applied and removed at 114 by the transmitter 160. The control circuit 180 can include a controller (e.g., microprocessor) that executes instructions and/or can include discrete circuit components arranged to implement control functions, such as analog and/or digital comparators for monitoring thresholds and output circuits to set the value of the capacitor 140 and/or resistor 150.

In one example, the control circuit 180 executes a calibration procedure when the object 130 is outside the sensing range of the ultrasonic transducer 110. The calibration procedure adjusts a value of the resistor 150 (e.g., selecting a resistor in a resistor network via a switch setting) or capacitor 140 such that the signal at the receiver input 174 based on monitoring T1, and in response to the electrical drive signal at 114 being disabled (in the absence of any object 130 within predetermined range of the transducer) is below the predetermined threshold voltage. For example, the control circuit 180 can adjust the value of the resistor 150 based on the peak energy of the signal at 174 in response to disabling the electrical drive signal at 114. The envelope of the damping energy can vary with time. Thus, the peak energy can be observed within a given time period or a time window following the excitation interval. As another example, the control circuit 180 can adjust the value of the capacitor 140 or resistor 150 based on the energy of the received calibration signal at input 174 as it is integrated over time. In yet another example, the control circuit 180 can adjust the value of the capacitor 140 or resistor 150 based on a stored wave shape profile for the received calibration signal at the receiver input 174 in response to the electrical drive signal at 114 being removed. In yet another example, the control circuit 180, the transmitter 160, the receiver 170, and the variable resistor 150 can be implemented on a substrate of an IC chip.

Figure 2:
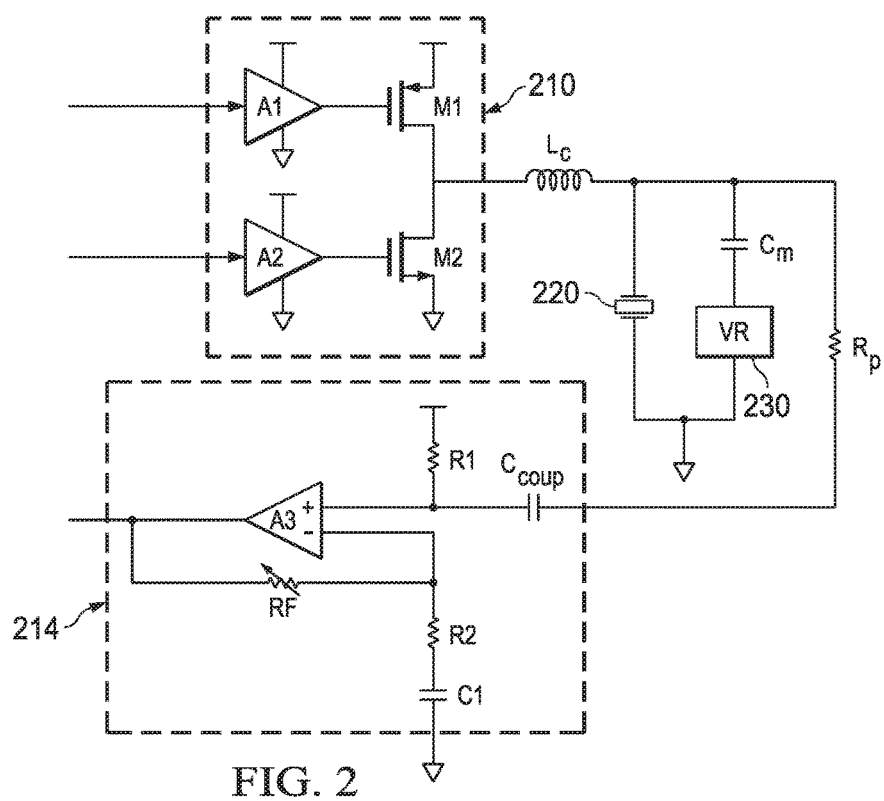
FIG. 2 illustrates an example of a transmitter and receiver circuit that utilizes an adjustable resistor/capacitor network to mitigate ringing of an ultrasonic transducer.

FIG. 2 is an example of a transmitter circuit 210 and receiver circuit 214 that utilizes an adjustable resistor/capacitor network to mitigate ringing of an ultrasonic transducer 220. The transmitter circuit 210 can include push/pull amplifiers A1 and A2 which in turn drive transistor drivers M1 and M2 (e.g., field effect transistors), which are coupled to provide an electrical drive signal to the transducer 220 according to amplified signals from A1 and A2. Output from drivers M1 and M2 can be coupled though a series inductor Lc to the transducer 220. In another example, the driver M1 and M2 can drive a transformer (not shown) to provide the electrical drive signal to the transducer 220. In the example of FIG. 2, a capacitor Cm (e.g., fixed or variable capacitor) can be coupled to a terminal of the transducer 220 via one node and coupled to a variable resistor (VR) 230 via another node. Circuit connections to the variable resistor 230 are shown with respect to variable resistor Rc of FIG. 3. Received electrical signals from the transducer 220 are coupled to the receiver circuit 214 via resistor Rp. The resistor Rp can couple the signal via coupling capacitor Ccoup to an amplifier A3 of the receiver 214. Resistor R1 can be provided as a pull-up whereas resistor Rf, R2, and capacitor C1 form a feedback network for amplifier A3.

A control circuit (control circuit 180) can monitor the output from the amplifier A3 and adjust the value of the variable resistor 230 in response to such monitoring. During a calibration procedure, the transmitter 210 can excite the transducer 220 with an electrical drive signal. After the transmitter 210 terminates the electrical drive signal (a pulsed signal), the output from the transducer 220 can be monitored by the receiver 214 to observe how long it takes for signal at the input of the transducer to dampen to below a predetermined threshold. Adjustment to the variable resistor 230 can be implemented automatically via a control circuit (or factory setting) during a calibration mode/procedure to shorten the time it takes for the transducer ringing to dampen in response to the electrical drive signal applied by the transmitter 210. For example, during such calibration, incremental resistor and/or capacitor adjustments can be made until the ultrasonic transducer ringing response has been suitably reduced (e.g., ringing is reduced below predetermined threshold voltage after a period of time). The values for Cm and VR 230 can be set based on desired circuit responses to mitigate ringing. For example, more capacitance (e.g., increasing Cm) can be added. This results in a decay frequency that is different (e.g., higher or lower frequency) than the series resonance frequency of the tuning circuit. The capacitor Cm should not be too large otherwise the decay time of the ringing signal after the excitation interval can increase. The resistor VR 230 can be set so that the corresponding decay time of the ringing signal is shorter. However, the decay frequency should be different and separated from the series resonance frequency. The ultrasonic transducer is typically driven at its series resonance frequency to generate maximum sound pressure going out the transducer. The separation of the decay frequency and the series resonance frequency of the transducer allows separation of the decay signal and the electrical receive signal reflected from objects using a bandpass filter to perform the separation.

Figure 3:
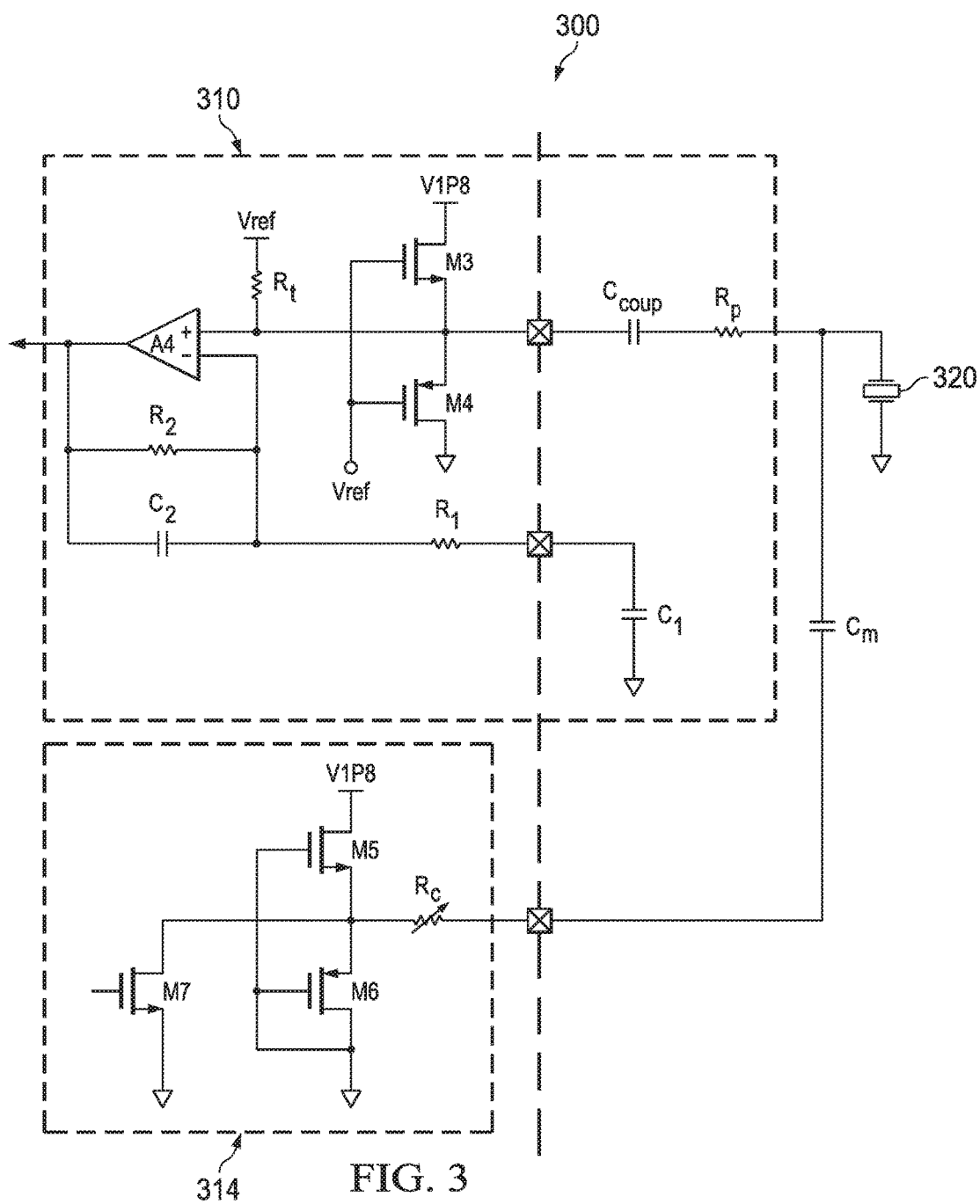
FIG. 3 illustrates an example of a receiver circuit and tuning circuit that utilizes an adjustable resistor/capacitor network to mitigate ringing of an ultrasonic transducer.

FIG. 3 is an example circuit 300 that includes a receiver circuit 310 and tuning circuit 314 that utilizes an adjustable resistor/capacitor network to mitigate ringing of an ultrasonic transducer 320. The receiver circuit 310 receives an electrical receive signal from the transducer 320 via resistor Rp and coupling capacitor Ccoup. The receiver circuit 310 includes an amplifier circuit A4 that receives the electrical receive signal at the non-inverting input of A4 from Ccoup. The non-inverting input of A4 can be pulled up via resistor Rt, which is coupled to a reference voltage Vref. A feedback network of R2 and C2 (connected in parallel) can be connected between the output and the inverting input of A4. The feedback network further can be AC coupled to ground via resistor R1 and capacitor C1. A first clamp circuit consisting of transistor devices M3 and M4 can be provided at a corresponding terminal of the IC to protect the amplifier A4 from high voltages of the transducer 320. The tuning circuit 314 can be provided to adjust an RC network formed with a capacitor Cm and variable resistor Rc. An arrow is shown through resistor Rc indicates that its value can be changed (e.g., via a controller and/or factory setting).

A control circuit (e.g., control circuit 180) can provide such adjustment by selecting different resistance values from a configurable resistor network in one example. For example, the resistor Rc can have its value adjusted during manufacturing and testing of the circuit 300. Alternatively or additionally, the control circuit can calibrate and set the value of the variable resistor Rc during a calibration procedure, such as at power up or in response to another predefined event. A second clamp circuit consisting of transistor devices M5 and M6 can be provided to protect the resistor Rc from high transducer voltages. A transistor device M7 can be provided to enable or disable the connection of the variable resistor Rc to the capacitor Cm in response to a signal applied to the gate of M7. For example, in one state M7 can provide a ground path for Rc and in another state, M7 can float Rc to effectively remove its impact from influencing the circuit, if desired.

Figure 4:
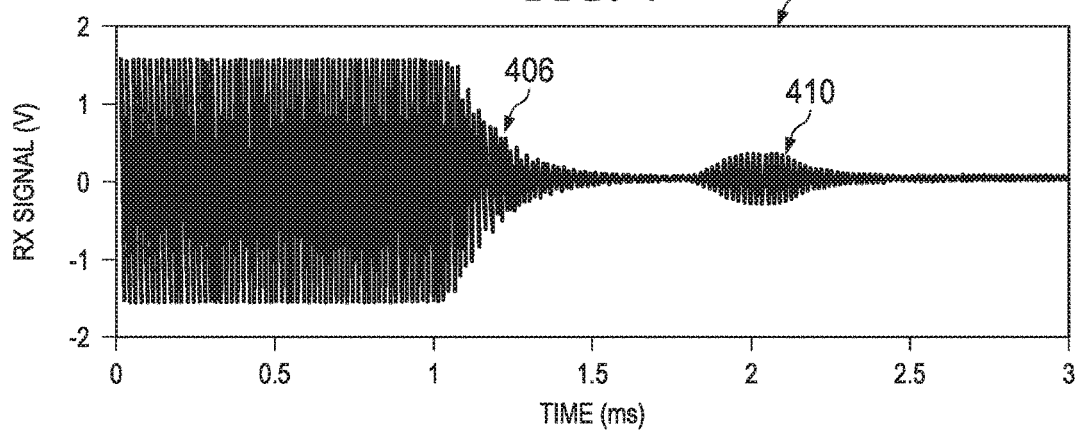
FIG. 4 is an example diagram of an ultrasonic transducer excitation signal and echo signal where no tuning is applied to the transducer.

FIG. 4 is an example diagram 400 of an ultrasonic transducer excitation signal and echo signal where no variable resistance is applied to the transducer, as disclosed herein. The vertical axis of the diagram 400 shows received signal strength in volts and the horizontal axis represents time in milliseconds. After a drive signal 406 is removed from the transducer at time t equals 0.25 ms, the transducer output continues to ring before finally dampening out at about time t equals 1.5 milliseconds. A reflected echo signal 410 is shown to occur over a time interval following the excitation signal 406 that is applied to drive the ultrasonic transducer. In this example, when no resistance is applied to the transducer as described herein, the time between dampening of the transducer and the beginnings of the echo signal 410 is about 0.3 milliseconds.

Figure 5:
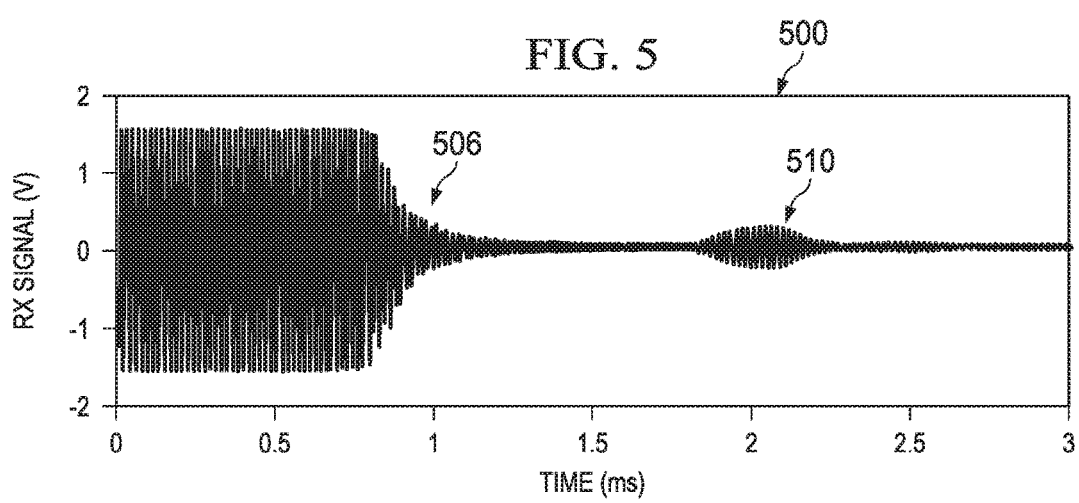
FIG. 5 is an example diagram of an ultrasonic transducer excitation signal and echo signal where resistive tuning is applied to the transducer.

FIG. 5 is an example diagram 500 of an ultrasonic transducer excitation signal and echo signal where resistive tuning is applied to the transducer, as disclosed herein. After a drive signal 506 is removed from the transducer at time t=0.25 ms, the transducer output continues to ring before finally dampening out (to below a threshold) at about time t=1.25 milliseconds. The tuning RC network in this example is configured where the value of the transducer capacitor is about 680 pF and the tuning resistor is set to about 1 k ohms. A reflected echo signal 510 is shown to occur over a time interval following the excitation signal. The time between dampening of the transducer and the beginning of the echo signal 510 is about 0.55 milliseconds in this example. By increasing the ringing time of the transducer in response to the drive signal, objects can be detected closer in range to the transducer since the dampening occurs at a faster rate when the tuning resistance is applied at the terminal of the ultrasonic transducer.

Figure 6:
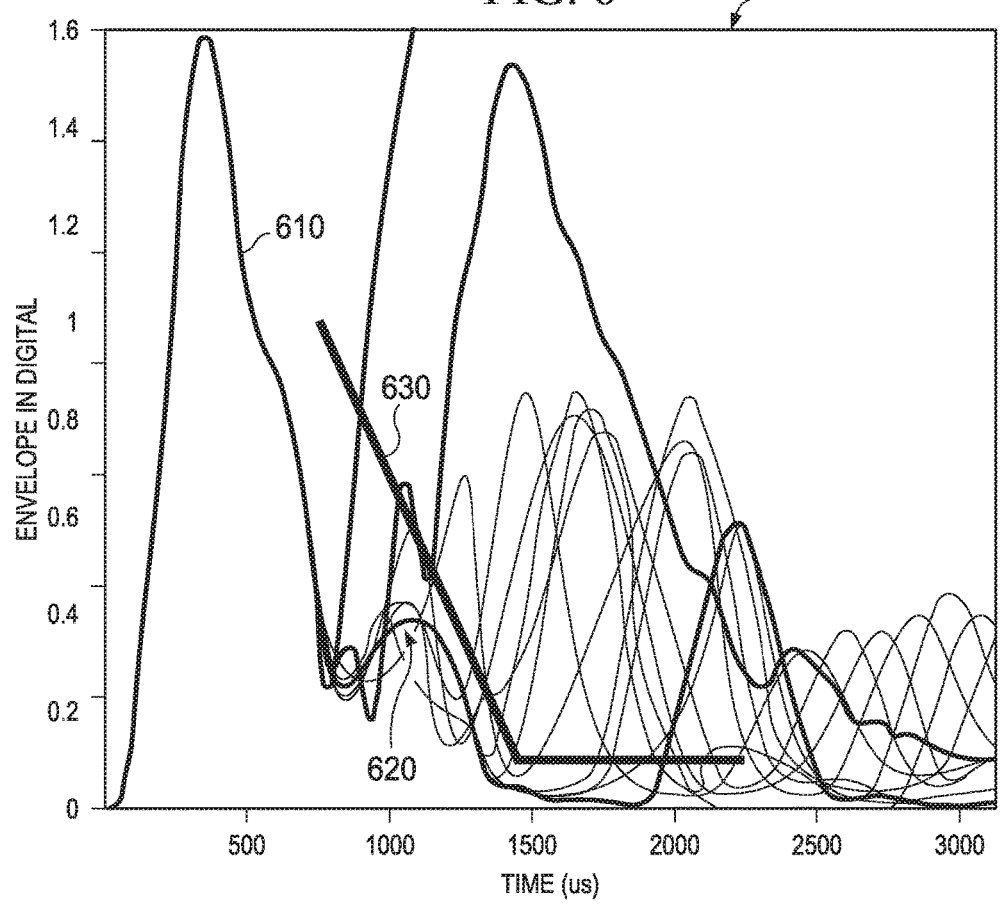
FIG. 6 is an example signal diagram showing damped energy and echoes from an object at various distances from 1 cm to 30 cm from an ultrasonic transducer when no resistive tuning is applied to the transducer.
Figure 7:
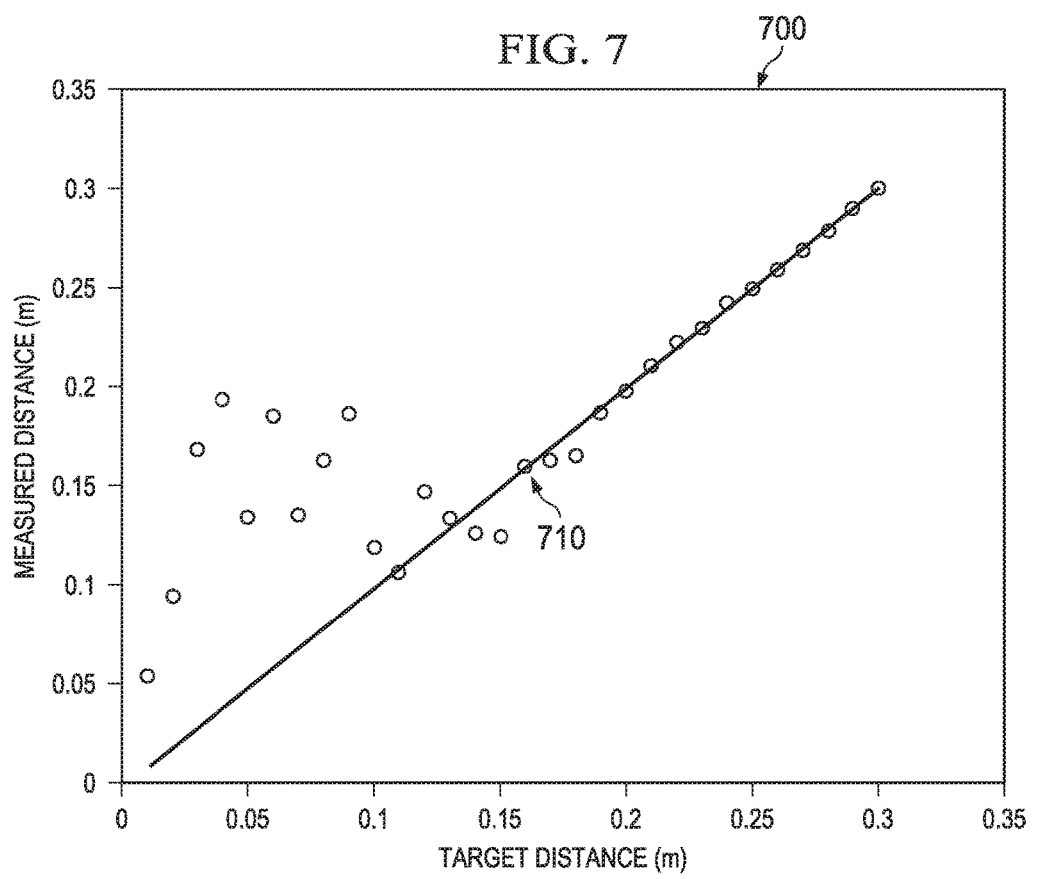
FIG. 7 is an example diagram that shows measurement accuracy of an ultrasonic transducer when no resistive tuning is applied to the transducer.

FIG. 6 is an example signal diagram 600 showing damped energy and echoes from an object at various distances from 1 cm to 30 cm from an ultrasonic transducer when no resistive tuning is applied to the transducer. The vertical axis is a unit-less measure of signal strength versus time on the horizontal axis in microseconds. A signal 610 represents the response of a transducer to an applied electrical drive signal. As shown at 620, the signal 610 falls below a threshold line 630 at about a time t=1200 microseconds. The threshold at 630 can change over time in some examples. FIG. 7 is a related diagram 700 to FIG. 6 that shows measurement accuracy of an ultrasonic transducer when no resistive tuning is applied to the transducer. The vertical axis represents measured distance in meters and the horizontal axis represents actual target distance in meters. In this example, accurate measurements cannot be determined until the target is moved away from the transducer at about 0.16 meters such as shown at 710.

Figure 8:
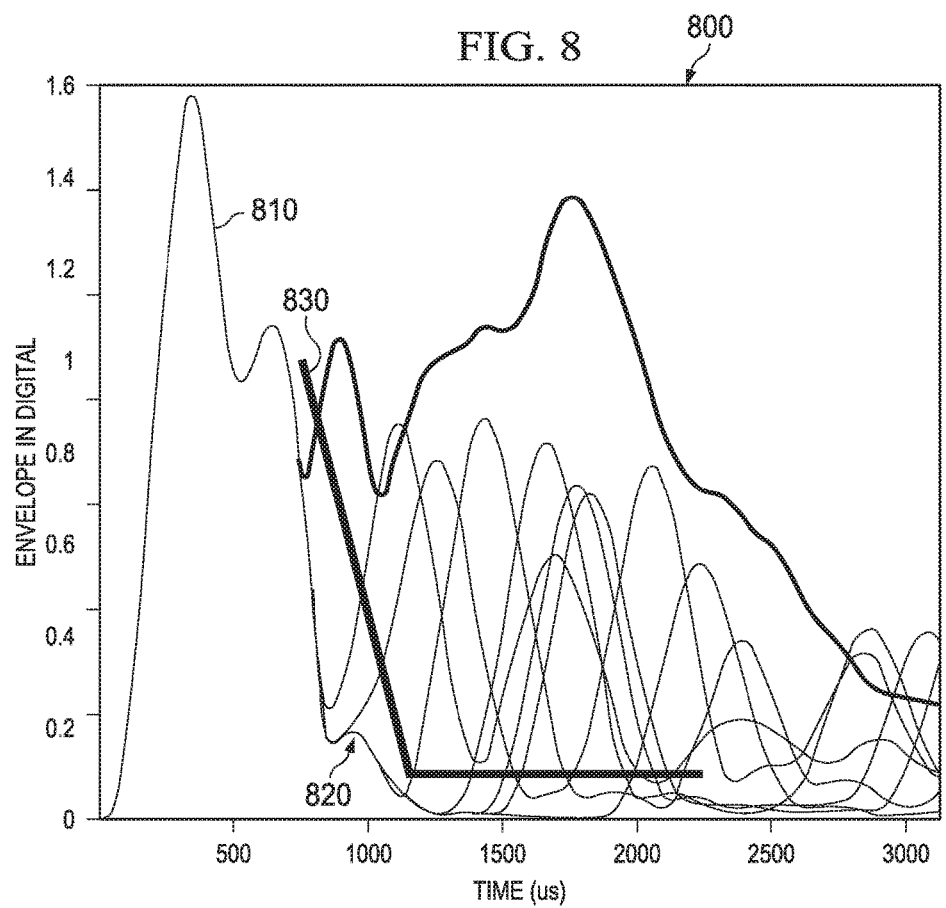
FIG. 8 is an example signal diagram showing damped energy and echoes from an object at various distances from 1 cm to 30 cm from an ultrasonic transducer when resistive tuning is applied to the transducer.
Figure 9:
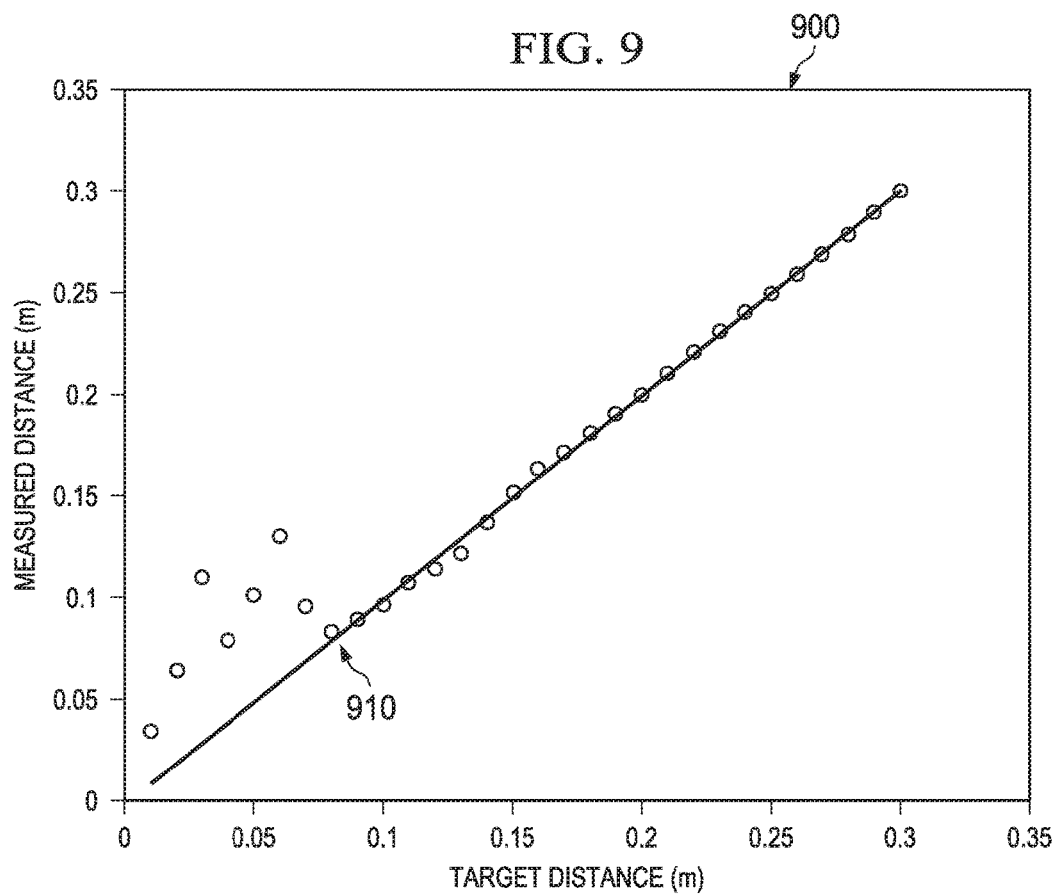
FIG. 9 is an example diagram that shows measurement accuracy of an ultrasonic transducer when no resistive tuning is applied to the transducer.

FIG. 8 is an example signal diagram 800 showing damped energy and echoes from an object at various distances from 1 cm to 30 cm from an ultrasonic transducer when resistive tuning is applied to the transducer (via tuning resistor of RC network). The vertical axis is a unit-less measure of signal strength versus time on the horizontal axis in microseconds. A signal 810 represents the response of an ultrasonic transducer to an applied electrical drive signal. As shown at 820, the signal 810 falls below a threshold line 830 at about a time t=900 microseconds. As noted above with respect to FIG. 6, the threshold 830 can change over time. FIG. 9 is a related diagram 900 to FIG. 8 that shows measurement accuracy of an ultrasonic transducer when no resistive tuning is applied to the transducer. The vertical axis represents measured distance in meters and the horizontal axis represents actual target distance in meters. In this example, accurate measurements cannot be determined until the target is moved away from the transducer at about 0.07 meters such as shown at 810. The resistive tuning of about 1 k ohm that forms a network with a 680 pF capacitor in this example improves measured short distance range of the ultrasonic transducer performance by about 9 centimeters or more over non-tuned transducer circuits (FIGS. 6-7).

Figure 10:
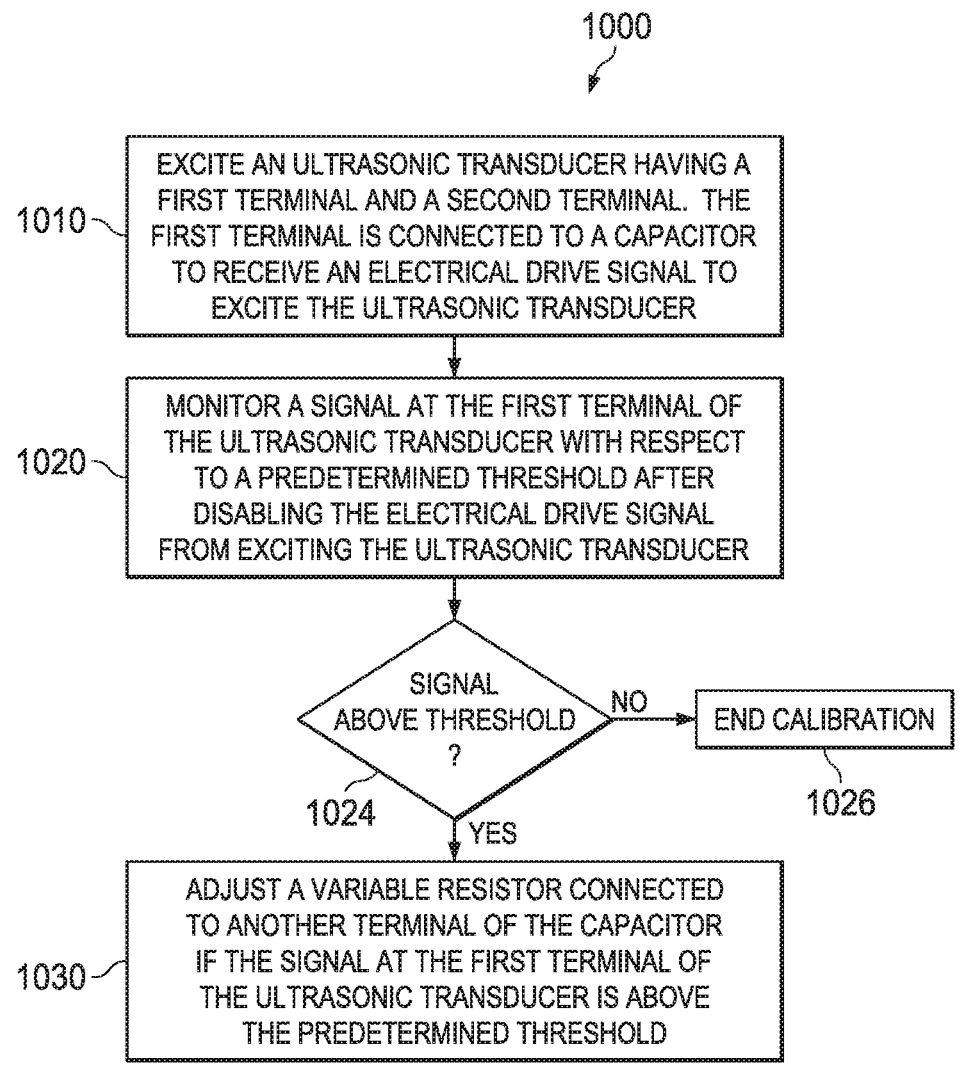
FIG. 10 illustrates an example method to mitigate ringing of an ultrasonic transducer.

In view of the foregoing structural and functional features described above, an example method will be better appreciated with reference to FIG. 10. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various hardware components configured to execute machine readable instructions stored in memory and executable by an integrated circuit or a processor, for example.

FIG. 10 illustrates an example method to network to tune circuitry to mitigate ringing of an ultrasonic transducer. At 1010, the method 1000 includes exciting an ultrasonic transducer (a transceiver) having a first terminal and a second terminal (e.g., via transmitter 160 of FIG. 1). For example, the first terminal is connected to a capacitor to receive an electrical drive signal to excite the ultrasonic transducer. At 1020, the method 1000 includes monitoring a signal at the first terminal of the ultrasonic transducer with respect to a predetermined threshold after disabling the electrical drive signal from exciting the ultrasonic transducer (e.g., via receiver circuit 170 of FIG. 1). At 1024, a determination is made as to whether the signal at the first terminal of the ultrasonic transducer is above the threshold (e.g., via control circuit 180 of FIG. 1). If below the threshold at 1024, the method 1000 proceeds to 1026 and ends the calibration. If above the threshold at 1024, the method 1000 proceeds to 1030 and includes adjusting a variable resistor connected to another terminal of the capacitor if the signal at the first terminal of the ultrasonic transducer is above the predetermined threshold (e.g., via control circuit 180 of FIG. 1). The variable resistor and the capacitor form a resistor-capacitor (RC) network that is adjusted to mitigate ringing at the first terminal of the ultrasonic transducer in response to the disabling of the electrical drive signal. Although not shown, the method 1000 can also include adjusting the value of the variable resistor based on the peak energy of the signal, the energy of the signal as it is integrated over time, or based on a stored wave shape profile for the signal in response to the disabling of electrical drive signal at the terminal of the ultrasonic transducer.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A device, comprising:
an ultrasonic transducer having a terminal;
a capacitor; and
a resistor coupled through the capacitor to the terminal, in which the resistor has a variable resistance or the capacitor has a variable capacitance;
the ultrasonic transducer configured to:
during a first time period, receive an electrical drive signal at the terminal, wherein a voltage at the terminal drops below a threshold during a second time period after the first time period;
provide an ultrasound signal responsive to the electrical drive signal;
receive a reflection of the ultrasound signal; and
after the first and second time periods, provide an electical receive signal at the terminal responsive to the reflection;
in which the device is tunable by adjusting the variable resistance or the variable capacitance to shorten the second time period.

2. The device of claim 1, further comprising a transmitter circuit configured to provide the electrical drive signal to the terminal.

3. The device of claim 2, wherein the transmitter circuit includes: a push pull amplifier configured to generate the electrical drive signal; and an inductor or transformer coupled between the push pull amplifier and the first terminal.

4. The device of claim 2, further comprising a receiver circuit coupled to the terminal, the receiver circuit configured to receive the electrical receive signal.

5. The device of claim 4, wherein the receiver circuit includes a first clamp circuit configured to limit a voltage of the electrical receive signal at the receiver circuit.

6. The device of claim 4, further comprising a control circuit configured to adjust the variable resistance or the variable capacitance based on a comparison between a threshold voltage and the voltage of the electrical receive signal at the receiver circuit.

7. The device of claim 6, wherein the control circuit is configured to adjust the variable resistance or the variable capacitance to shorten the second time period by executing a calibration procedure after the first time period.

8. The device of claim 7, wherein the control circuit, the transmitter circuit, the receiver circuit and the resistor are integrated on a substrate of an integrated circuit.

9. The device of claim 1, wherein the resistor and the capacitor are part of a tuning circuit, and the variable resistance or the variable capacitance is adjustable to make a decay frequency of the electrical drive signal be different than a series resonance frequency of the tuning circuit.

10. The device of claim 9, wherein the tuning circuit includes a transistor configured to selectively disconnect the resistor from the capacitor responsive to an activation signal.

11. A device, comprising:
an ultrasonic transducer having a terminal;
a transmitter circuit having an output couple to the terminal, the transmitter circuit configured to provide an electrical drive signal at the output;
a receiver circuit having an input coupled to the terminal, the receiver circuit configured to receive an electrical receive signal at the input;
a capacitor; and
a resistor couple through the capacitor to the terminal, in which the resistor has a variable resistance or the capacitor has a variable capacitance;
the ultrasonice transducer configured to:
during a first time period, receive the electrical drive signal at the terminal, wherein a voltage at the terminal drops below a threshold during a second time period after the first time period; and
after the first and second time periods, provide the electrical receive signal at the terminal;
in which the device is tunable by adjusting the variable resistance or the variable capacitance to shorten the second time period.

12. The device of claim 11, wherein the transmitter circuit includes a push pull amplifier configured to generate the electrical drive signal; and an inductor coupled between the push pull amplifier and the terminal.

13. The device of claim 12, wherein the resistor is a first resistor, and the receiver circuit includes a second resistor coupled to the terminal.

14. The device of claim 11, wherein the resistor and the capacitor are part of a tuning circuit, and the tuning circuit includes a clamp circuit coupled to the resistor, the clamp circuit configured to limit a voltage of the electrical receive signal.

15. The device of claim 14, wherein the tuning circuit includes a transistor configured to selectively disconnect the resistor from the capacitor responsive to an activation signal.

16. The device of claim 11, further comprising a control circuit configured to adjust the variable resistance or the variable capacitance based on a comparison between a threshold voltage and the voltage of the electrical receive signal at the receiver circuit.

17. The device of claim 16, wherein the control circuit is configured to adjust the variable resistance or the variable capacitance to shorten the second time period by executing a calibration procedure after the first time period.

18. The device of claim 11, wherein the resistor and the capacitor are part of a tuning circuit, and the variable resistance or the variable capacitance is adjustable to make a decay frequency of the electrical drive signal be different than a series resonance frequency of the tuning circuit.

19. A method, comprising:
exciting an ultrasonic transducer having a terminal, the terminal coupled to a capacitor to receive an electrical drive signal to excite the ultrasonic transducer;
monitoring a signal at the terminal with respect to a threshold after disabling the electrical drive signal from exciting the ultrasonic transducer; and
adjusting a resistance of a variable resistor, which is couple through the capacitor to the ultrasonic transducer to form a resistor-capacitor (RC) network, if the signal at the terminal is above the threshold, to mitigate ringing at the first terminal of the ultrasonic transducer after the disabling of the electrical drive signal.

20. The method of claim 19, further comprising adjusting the resistance of the variable resistor based on a peak energy of the signal at the terminal over a time period, the energy of the signal at the terminal as it is integrated over time, or based on a stored wave shape profile for the signal at the terminal responsive to the disabling of the electrical drive signal.

* * * * *